United States Patent
Araki (10) Patent No.: US 11,276,527 B2
(45) Date of Patent: Mar. 15, 2022

(54) MULTILAYER CERAMIC CAPACITOR

(71) Applicant: Murata Manufacturing Co., Ltd., Nagaokakyo (JP)

(72) Inventor: Keisuke Araki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 287 days.

(21) Appl. No.: 16/574,232

(22) Filed: Sep. 18, 2019

(65) Prior Publication Data
US 2020/0105470 A1    Apr. 2, 2020

(30) Foreign Application Priority Data
Sep. 27, 2018   (JP) .............................. JP2018-182057

(51) Int. Cl.
*H01G 4/12*   (2006.01)
*H01G 4/012*   (2006.01)
*H01G 4/248*   (2006.01)
*H01G 4/30*   (2006.01)

(52) U.S. Cl.
CPC ........... *H01G 4/1227* (2013.01); *H01G 4/012* (2013.01); *H01G 4/248* (2013.01); *H01G 4/30* (2013.01)

(58) Field of Classification Search
CPC ........ H01G 4/1227; H01G 4/012; H01G 4/30; H01G 4/248
USPC .... 361/321.1, 301.4, 312, 313, 321.4, 321.5
See application file for complete search history.

(56) References Cited

U.S. PATENT DOCUMENTS

| | | | |
|---|---|---|---|
| 2006/0198078 A1* | 9/2006 | Miyauchi | H01G 4/30 361/305 |
| 2009/0225494 A1* | 9/2009 | Yamazaki | C04B 35/4682 361/321.4 |
| 2017/0018363 A1 | 1/2017 | Tanaka et al. | |
| 2017/0133157 A1 | 5/2017 | Fukunaga et al. | |
| 2017/0148572 A1 | 5/2017 | Fukunaga et al. | |
| 2018/0240598 A1 | 8/2018 | Tanaka et al. | |

FOREIGN PATENT DOCUMENTS

| | | |
|---|---|---|
| JP | 2008010530 A | 1/2008 |
| JP | 2010232248 A | 10/2010 |
| JP | 2016001721 A | 1/2016 |
| JP | 2017028013 A | 2/2017 |

* cited by examiner

*Primary Examiner* — Arun Ramaswamy
(74) *Attorney, Agent, or Firm* — Arent Fox LLP (57) ABSTRACT

A multilayer ceramic capacitor that includes a laminate having a plurality of dielectric layers and a plurality of internal electrodes that are alternately stacked, and external electrodes. Each of the dielectric layers contains first crystal grains and second crystal grains that each contain Ba, Ti, and a rare-earth element. A first mole ratio M1 of the rare-earth element to the Ti in a range from an interface to 50 nm inclusive of the first crystal grains and a second mole ratio M2 of the rare-earth element to the Ti in a range of 50 nm to 100 nm inclusive from the interface satisfy $0.95 \leq M1/M2 \leq 1.05$. A third mole ratio M3 of the rare-earth element to the Ti in the second crystal grains is half or less of a fourth mole ratio M4 of the rare-earth element to the Ti in the first crystal grains.

19 Claims, 7 Drawing Sheets

MULTILAYER CERAMIC CAPACITOR

CROSS REFERENCE TO RELATED APPLICATIONS

The present application claims priority to Japanese Patent Application No. 2018-182057, filed Sep. 27, 2018, the entire contents of which are incorporated herein by reference.

BACKGROUND OF THE INVENTION

Field of the Invention

The present invention relates to a multilayer ceramic capacitor.

Description of the Related Art

There is known a multilayer ceramic capacitor including a laminate obtained by alternately stacking a plurality of dielectric layers and a plurality of internal electrodes, and an external electrode that is provided on a surface of the laminate and is electrically conductive to the internal electrodes extended to the surface of the laminate.

In recent years, while the use of such a multilayer ceramic capacitor is expanding, the multilayer ceramic capacitor is most often used in a severer environment which is a high-temperature environment. A high electric field in the high-temperature environment causes a problem of decreasing the insulation resistance.

Japanese Patent Application Laid-Open No. 2008-10530 discloses a multilayer ceramic capacitor including a dielectric layer that contains a plurality of crystal grains containing a solid solution of oxides of magnesium, manganese, and a rare-earth element in barium titanate as a main component. It is possible to suppress the degradation of the insulation resistance in the high-temperature environment by making the crystal grains contained in the dielectric layer have a core-shell structure including a core portion and a shell portion around the core portion.

SUMMARY OF THE INVENTION

Even a multilayer ceramic capacitor configured to include a dielectric layer that contains crystal grains having a core-shell structure is incapable of sufficiently suppressing the degradation of the insulation resistance in the high-temperature environment and still needs to be improved.

The present invention solves the above problem and an object of the present invention is to provide a multilayer ceramic capacitor capable of suppressing the degradation of the insulation resistance in the high-temperature environment.

A multilayer ceramic capacitor according to an aspect of the present invention includes a laminate having a plurality of dielectric layers and a plurality of internal electrodes that are alternately stacked; and an external electrode on a surface of the laminate and electrically conductive to the internal electrodes extended to a surface of the laminate. Each of the dielectric layers contain first crystal grains that are disposed in a plane direction on a surface perpendicular to a stacking direction of the internal electrodes and contain Ba, Ti, and a first rare-earth element; and second crystal grains that are disposed in the plane direction and contain Ba, Ti, and a second rare-earth element. A first mole ratio M1 of the first rare-earth element to the Ti contained in a range from an interface to 50 nm inclusive of the first crystal grains and a second mole ratio M2 of the first rare-earth element to the Ti contained in a range of 50 nm to 100 nm inclusive from the interface of the first crystal grains satisfy a relationship $0.95 \leq M1/M2 \leq 1.05$. A third mole ratio M3 of the second rare-earth element to the Ti contained in the second crystal grains is half or less of a fourth mole ratio M4 of the first rare-earth element to the Ti contained in the first crystal grains, and a concentration of the second rare-earth element contained outside of the solid solution of the second crystal grains is lower than a concentration of the first rare-earth element contained outside of the solid solution of the first crystal grains.

The dielectric layer may include a first grain layer containing the first crystal grains continuously disposed in the plane direction and a second grain layer containing the second crystal grains continuously disposed in the plane direction.

The dielectric layer may include a third grain layer containing the second crystal grains, the second and the third grain layers being disposed between two adjacent internal electrodes in the stacking direction with the first grain layer sandwiched between the second and third grain layers.

The second mole ratio M2 of the first rare-earth element to the Ti contained in the range of 50 nm to 100 nm inclusive from the interface of the first crystal grains may be 1.7 times or more of a fifth mole ratio M5 of the second rare-earth element to the Ti contained in a range of 50 nm to 100 nm inclusive from an interface of the second crystal grains.

The dielectric layers may have a thickness of 0.1 μm or more and 6.0 μm or less.

The first crystal grains may have a larger average grain size than an average grain size of the second crystal grains.

The first crystal grains may have an average grain size of 150 nm to 500 nm, and the second crystal grains may have an average grain size of 100 nm to 200 nm.

The second crystal grains may have a core-shell structure having a higher mole ratio of the second rare-earth element to the Ti in a range from the interface to 50 nm inclusive than in the range of 50 nm to 100 nm inclusive from the interface.

The first and second rare-earth elements may be Dy.

The multilayer ceramic capacitor according to the present invention is capable of suppressing the degradation of the insulation resistance in the high-temperature environment. This effect is considered to be brought about by disposition of the rare-earth elements in the first crystal grains and the second crystal grains that form the dielectric layer and at the interface of each of the crystal grains because such disposition enables suppression of migration of oxygen vacancies to be a factor of the degradation of the insulation resistance.

DETAILED DESCRIPTION OF THE INVENTION

Hereinafter, characteristics of the present invention are specifically described by way of embodiments of the present invention.

First Embodiment

Figure 1:
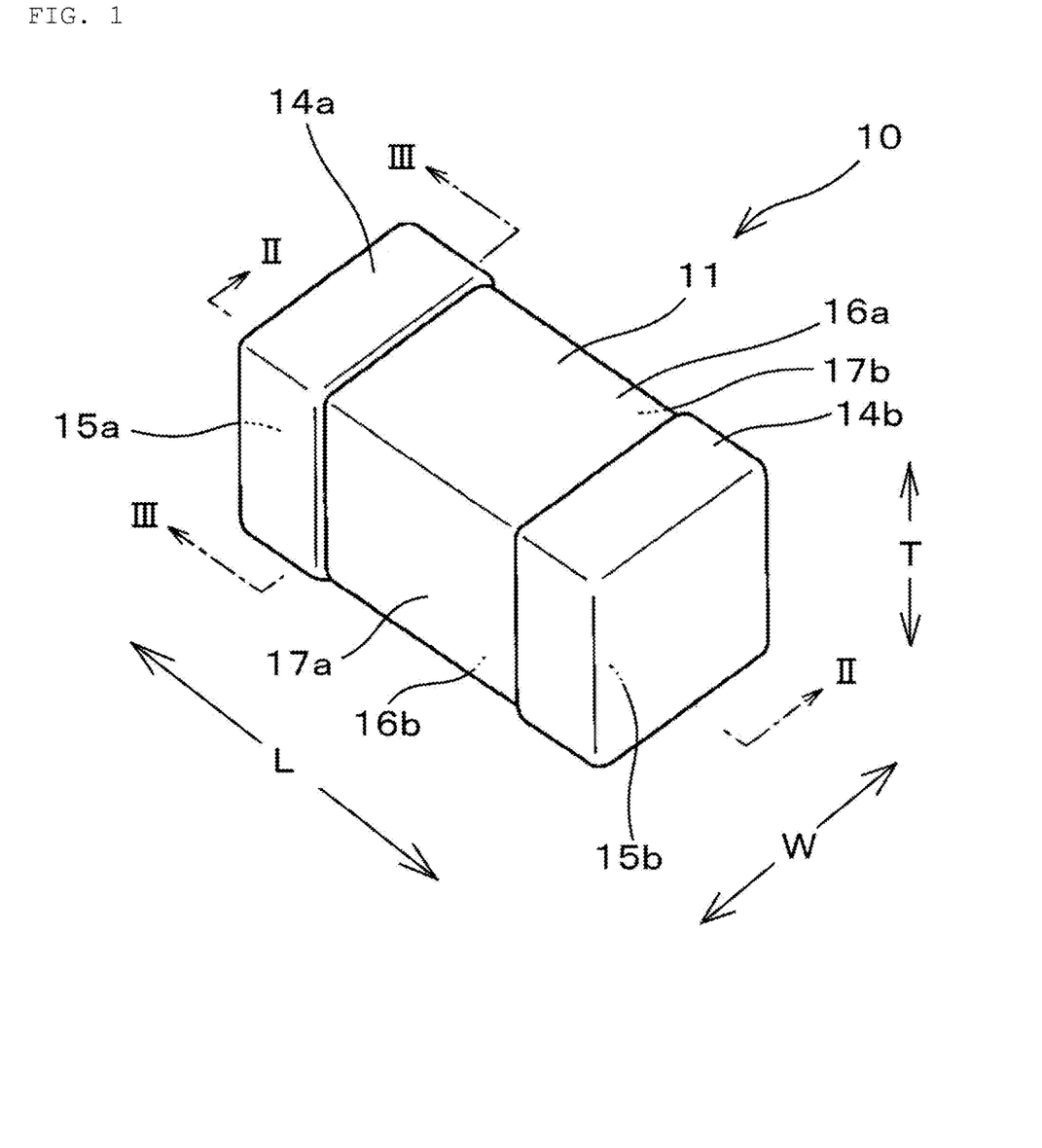
FIG. 1 is a perspective view of a multilayer ceramic capacitor according to a first embodiment.
Figure 2:
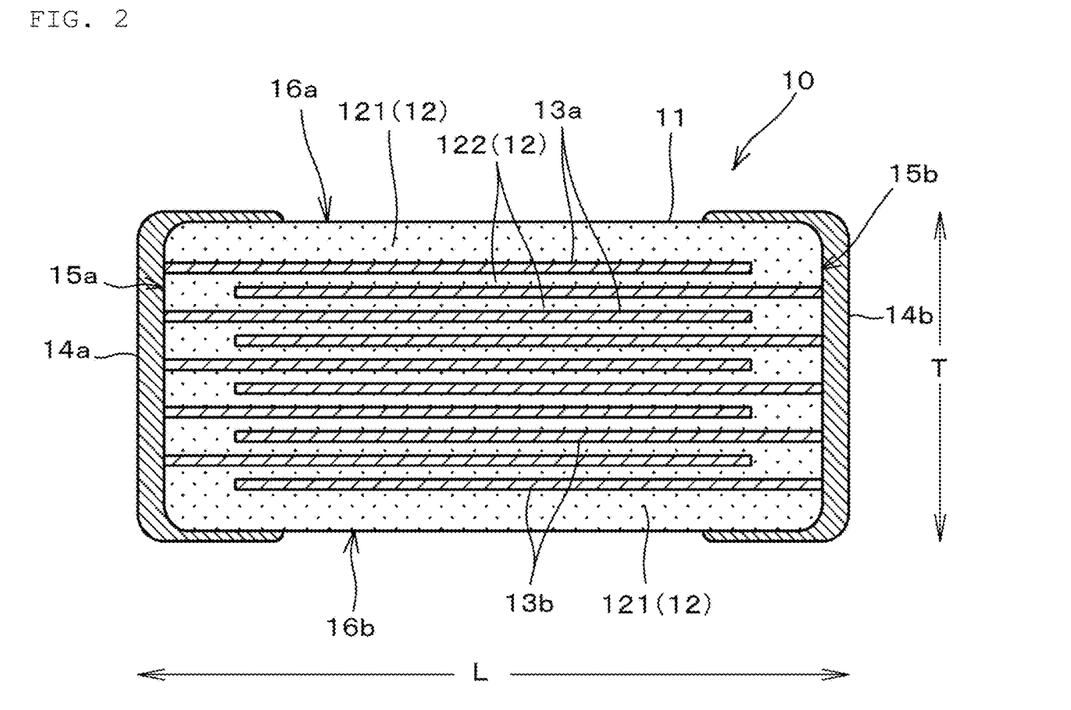
FIG. 2 is a sectional view along a line II-II of the multilayer ceramic capacitor shown in FIG. 1.
Figure 3:
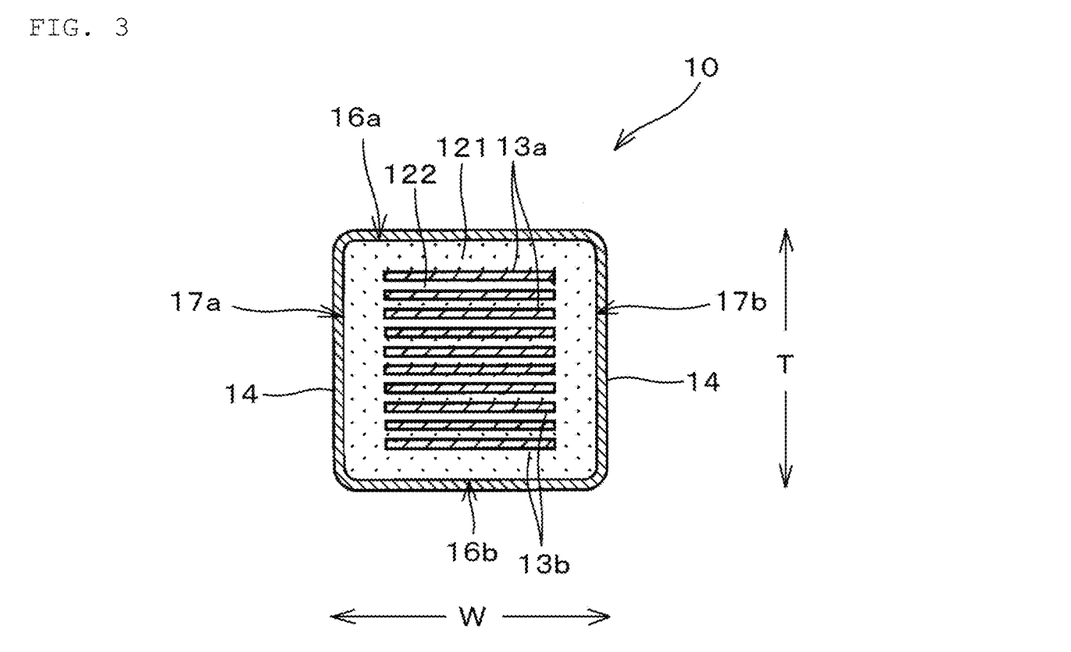
FIG. 3 is a sectional view along a line III-III of the multilayer ceramic capacitor shown in FIG. 1.

FIG. 1 is a perspective view of a multilayer ceramic capacitor 10 according to a first embodiment. FIG. 2 is a sectional view along a line II-II of the multilayer ceramic capacitor 10 shown in FIG. 1. FIG. 3 is a sectional view along a line III-III of the multilayer ceramic capacitor 10 shown in FIG. 1.

As shown in FIGS. 1 to 3, the multilayer ceramic capacitor 10 is an electronic component having a rectangular parallelepiped as a whole and includes a laminate 11 and a pair of external electrodes 14 (14a and 14b). The pair of external electrodes 14 (14a and 14b) are disposed opposite to each other as shown in FIG. 1.

Here, a direction in which the pair of external electrodes 14 are opposite to each other is defined as a length direction L of the multilayer ceramic capacitor 10, a stacking direction of internal electrodes 13 (13a and 13b) described later is defined as a thickness direction T, and a direction perpendicular to both the length direction L and the thickness direction T is defined as a width direction W.

The laminate 11 includes a first end surface 15a and a second end surface 15b opposite to each other in the length direction L, a first main surface 16a and a second main surface 16b opposite to each other in the thickness direction T, and a first side surface 17a and a second side surface 17b opposite to each other in the width direction W.

The first external electrode 14a is provided on the first end surface 15a, and the second external electrode 14b is provided on the second end surface 15b.

The dimensions of the length direction L, the width direction W, and the thickness direction T of the laminate 11 are, for example, 2.0 mm, 1.2 mm, and 1.2 mm, respectively. The dimensions of the laminate 11, however, are not limited to the above numerical values. It is possible to measure the dimensions of the laminate 11 with a micrometer or an optical microscope.

The laminate 11 preferably has rounded corners and ridge line portions. Here, the corners are portions where three surfaces of the laminate 11 intersect, and the ridge line portions are portions where two surfaces of the laminate 11 intersect.

As shown in FIGS. 2 and 3, the laminate 11 includes a dielectric layer 12, a first internal electrode 13a, and a second internal electrode 13b.

The dielectric layer 12 includes an outer dielectric layer 121 positioned on both outer sides in the thickness direction T of the laminate 11 and an inner dielectric layer 122 positioned between the first internal electrode 13a and the second internal electrode 13b.

The number of stacked inner dielectric layers 122 differs according to the size of the laminate 11. For example, when the dimensions of the length direction L, the width direction W, and the thickness direction T of the laminate 11 are 2.0 mm, 1.2 mm, and 1.2 mm, respectively, it is possible to set the number of stacked inner dielectric layers 122 at 200 or more and 1300 or less.

Alternatively, when the dimensions of the length direction L, the width direction W, and the thickness direction T of the laminate 11 are 1.6 mm, 0.8 mm, and 0.8 mm, respectively, it is possible to set the number of stacked inner dielectric layers 122 at 200 or more and 1000 or less.

Alternatively, when the dimensions of the length direction L, the width direction W, and the thickness direction T of the laminate 11 are 1.0 mm, 0.5 mm, and 0.5 mm, respectively, it is possible to set the number of stacked inner dielectric layers 122 at, for example, 200 or more and 800 or less.

Alternatively, when the dimensions of the length direction L, the width direction W, and the thickness direction T of the laminate 11 are 0.6 mm, 0.3 mm, and 0.3 mm, respectively, it is possible to set the number of stacked inner dielectric layers 122 at, for example, 200 or more and 600 or less.

The thickness of the inner dielectric layer 122 differs according to the size of the laminate 11. For example, when the dimensions of the length direction L, the width direction W, and the thickness direction T of the laminate 11 are 2.0 mm, 1.2 mm, and 1.2 mm, respectively, it is possible to set the thickness of the inner dielectric layer 122 at, for example, 0.1 μm or more and 6.0 μm or less.

Alternatively, when the dimensions of the length direction L, the width direction W, and the thickness direction T of the laminate 11 are 1.6 mm, 0.8 mm, and 0.8 mm, respectively, it is possible to set the thickness of the inner dielectric layer 122 at, for example, 0.1 μm or more and 4.0 μm or less.

Alternatively, when the dimensions of the length direction L, the width direction W, and the thickness direction T of the laminate 11 are 1.0 mm, 0.5 mm, and 0.5 mm, respectively, it is possible to set the thickness of the inner dielectric layer 122 at, for example, 0.1 μm or more and 2.5 μm or less.

Alternatively, when the dimensions of the length direction L, the width direction W, and the thickness direction T of the laminate 11 are 0.6 mm, 0.3 mm, and 0.3 mm, respectively, it is possible to set the thickness of the inner dielectric layer 122 at, for example, 0.1 μm or more and 1.0 μm or less.

The above-mentioned dimensions of the laminate 11 may have a tolerance of ±10%.

Figure 4:
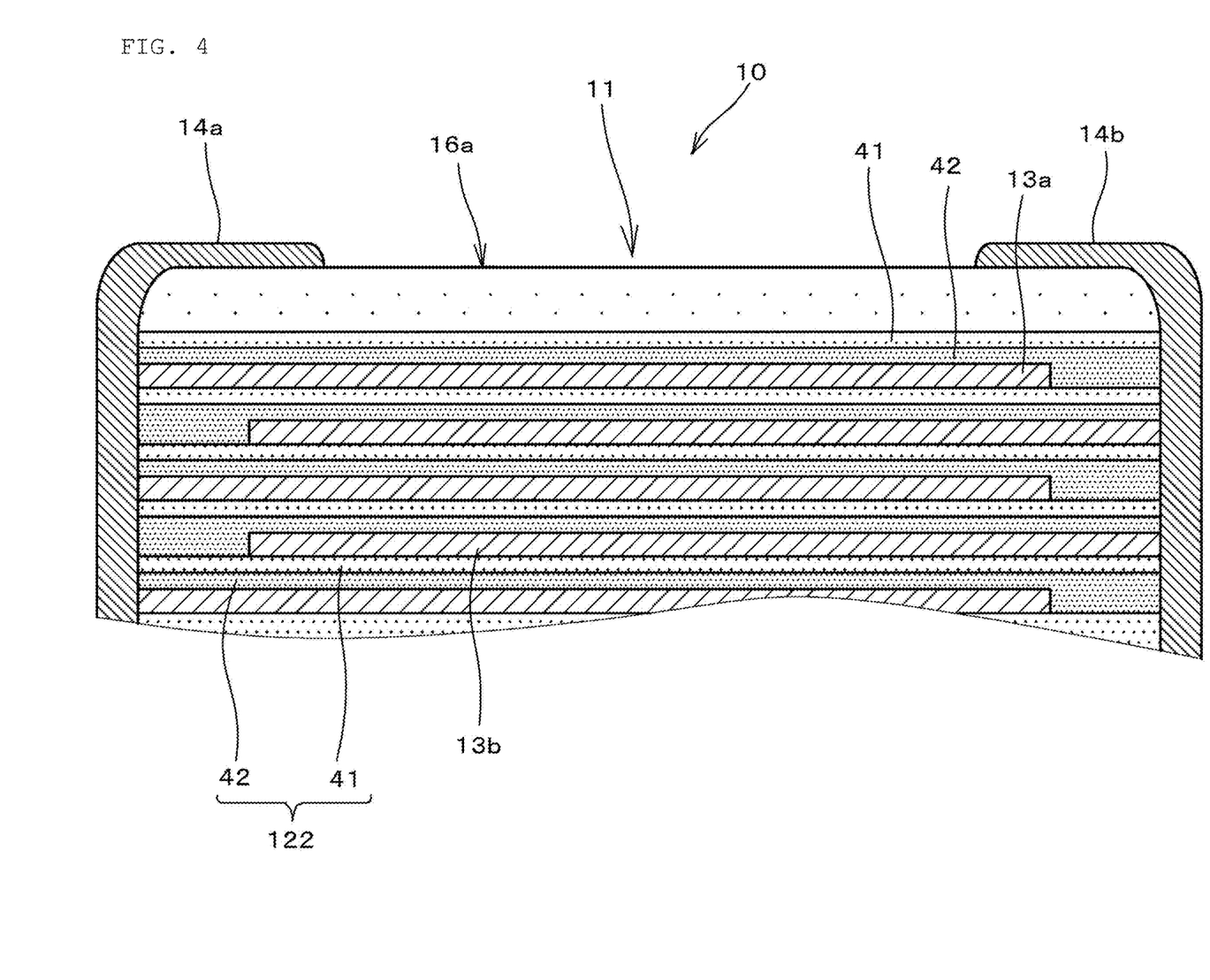
FIG. 4 is a partially enlarged view of a section of the multilayer ceramic capacitor according to the first embodiment and is a schematic sectional view for illustrating a detailed configuration of a dielectric layer.

FIG. 4 is a partially enlarged view of a section of the multilayer ceramic capacitor 10 and is a schematic sectional view for illustrating a detailed configuration of the dielectric layer 12. The dielectric layer 12 contains first crystal grains and second crystal grains. More specifically, the dielectric layer 12 includes, as shown in FIG. 4, a first grain layer 41 containing the first crystal grains continuously disposed in a plane direction and a second grain layer 42 containing the second crystal grains continuously disposed in the plane direction. Here, the "plane direction" refers to an extending direction of a surface perpendicular to the stacking direction of the first internal electrode 13a and the second internal electrode 13b, that is, a surface perpendicular to the thickness direction T.

In the present embodiment, the inner dielectric layer 122 of the dielectric layer 12 is formed of two layers, i.e., the first grain layer 41 and the second grain layer 42.

The present invention excludes neither a configuration where the first grain layer 41 contains the second grains nor a configuration where the second grain layer 42 contains the first grains.

The first crystal grains have a solid-solution structure containing a first rare-earth element uniformly in a main component of barium titanate $BaTiO_3$. Examples of the first rare-earth element include dysprosium Dy.

The first crystal grains have a larger average grain size than an average grain size of the second crystal grains. The first crystal grains have an average grain size of, for example, 150 nm to 500 nm.

Here, the "solid-solution structure containing a first rare-earth element uniformly" means that, with a first mole ratio of the first rare-earth element to Ti contained in a range from an interface to 50 nm inclusive of the first crystal grains defined as M1 and a second mole ratio of the first rare-earth element to Ti contained in a range of 50 nm to 100 nm inclusive from the interface of the first crystal grains defined as M2, the mole ratios M1 and M2 satisfy a relationship $0.95 \leq (M1/M2) \leq 1.05$. When this relationship is not satisfied, the first crystal grains have a core-shell structure.

It is possible to measure the mole ratios of the first rare-earth element to Ti by the following method. First, a surface defined by the thickness direction T and the length direction L of the laminate 11 is polished up to a central portion in the width direction W of the laminate 11 to expose a section, and the polished laminate 11 is, with a focused ion beam (FIB), made into pieces along sections containing a plurality of crystal grains. Then, a transmission electron microscope probe is put on a measurement position of the resultant sample piece, and the composition amounts of Ti and the first rare-earth element contained in a crystal grain are measured to obtain the mole ratios M1 and M2 of the first rare-earth element to Ti.

Here, the content of the first rare-earth element contained in the first crystal grains is preferably 6 parts by mole or more relative to 100 parts by mole of Ti. The first crystal grains containing 6 parts by mole or more of the first rare-earth element relative to 100 parts by mole of Ti are capable of suppressing the migration of the oxygen vacancies contained in the first crystal grains.

As regards the first rare-earth element contained in the crystal grains, the mole ratio M2 of the first rare-earth element to Ti contained in the range of 50 nm to 100 nm inclusive from the interface of the first crystal grains is 1.7 times or more of a fifth mole ratio M5 of the second rare-earth element to Ti contained in a range of 50 nm to 100 nm inclusive from an interface of the second crystal grains.

The second crystal grains have a core-shell structure including a solid solution of the second rare-earth element in a main component of barium titanate having higher crystallinity than the barium titanate contained in the first crystal grains. Examples of the second rare-earth element include dysprosium Dy.

The second crystal grains have an average grain size of, for example, 100 nm to 200 nm.

The amount of the second rare-earth element in the solid solution of the second crystal grains is less than the amount of the first rare-earth element in the solid solution of the first crystal grains. In the present embodiment, a third mole ratio M3 of the second rare-earth element to Ti in the solid solution of the second crystal grains is half or less of a fourth mole ratio M4 of the first rare-earth element to Ti in the solid solution of the first crystal grains.

A sixth mole ratio M6 of the second rare-earth element to Ti contained in a range from the interface to 50 nm inclusive of the second crystal grains is higher than the fifth mole ratio M5 of the second rare-earth element to Ti contained in the range of 50 nm to 100 nm inclusive from the interface of the second crystal grains.

The above-mentioned rare-earth elements are also contained among the first crystal grains and among the second crystal grains outside of the solid solution, and a concentration of the second rare-earth element contained outside of the solid solution of the second crystal grains is lower than a concentration of the first rare-earth element contained outside of the solid solution of the first crystal grains.

Provision of the second grain layer 42 that contains the second crystal grains configured as described above enables suppression of the change in the dielectric constant of the multilayer ceramic capacitor 10 attributed to temperature change.

The first internal electrode 13a is extended to the first end surface 15a of the laminate 11. The second internal electrode 13b is extended to the second end surface 15b of the laminate 11. The first internal electrode 13a and the second internal electrode 13b are alternately disposed in the thickness direction T, with the inner dielectric layer 122 interposed between the first internal electrode 13a and the second internal electrode 13b.

The first internal electrode 13a includes a counter electrode portion that is a portion facing the second internal electrode 13b and an extended electrode portion that is a portion extended from the counter electrode portion to the first end surface 15a of the laminate 11. The second internal electrode 13b includes a counter electrode portion that is a portion facing the first internal electrode 13a and an extended electrode portion that is a portion extended from the counter electrode portion to the second end surface 15b of the laminate 11.

The counter electrode portion of the first internal electrode 13a and the counter electrode portion of the second internal electrode 13b facing each other with the inner dielectric layer 122 interposed therebetween form capacitance and thus make the multilayer ceramic capacitor function as a capacitor.

The first internal electrode 13a and the second internal electrode 13b contain, for example, a metal such as Ni, Cu, Ag, Pd, or Au, or an alloy of Ag and Pd. The first internal electrode 13a and the second internal electrode 13b preferably contain Ni. The first internal electrode 13a and the second internal electrode 13b may further contain dielectric grains of the identical composition system with the ceramic contained in the dielectric layer 12.

The first internal electrode 13a and the second internal electrode 13b have a thickness of, for example, 0.4 μm or more and 1.0 μm or less.

Here, it is possible to measure the thickness of the dielectric layer 12 and the thickness of each of the first internal electrode 13a and the second internal electrode 13b by a following method.

First, a surface defined by the thickness direction T and the width direction W of the laminate 11, in other words, a surface perpendicular to the length direction L of the laminate 11 is polished to expose a section, which is observed with a scanning electron microscope (SEM). Next, the thickness of the dielectric layer 12 is measured on five lines in total including a center line that passes the center of the exposed section along the thickness direction and equally-spaced two lines of each on both sides of the center line. An average value of the five measurement values is defined as the thickness of the dielectric layer 12.

For more accurate measurement, the laminate 11 is divided into an upper portion, a central portion, and a lower portion in the thickness direction T, the above-mentioned five measurement values are obtained in each of the upper portion, the central portion, and the lower portion, and an average value of all the obtained measurement values is defined as the thickness of the dielectric layer 12.

The method of measuring the thickness of the dielectric layer 12 has been described above, and it is also possible to measure the thickness of the first internal electrode 13a and the second internal electrode 13b on the same section as the section for measuring the thickness of the dielectric layer 12 with a scanning electron microscope (SEM) in accordance with the method of measuring the thickness of the dielectric layer 12.

The first external electrode 14a is formed all over the first end surface 15a of the laminate 11 and is formed in a surrounding manner on the first end surface 15a, the first main surface 16a, the second main surface 16b, the first side surface 17a, and the second side surface 17b. The first external electrode 14a is electrically connected to the first internal electrode 13a.

The second external electrode 14b is formed all over the second end surface 15b of the laminate 11 and is formed in a surrounding manner on the second end surface 15b, the first main surface 16a, the second main surface 16b, the first side surface 17a, and the second side surface 17b. The second external electrode 14b is electrically connected to the second internal electrode 13b.

The first external electrode 14a and the second external electrode 14b each include, for example, an underlying electrode layer and a plating layer disposed on the underlying electrode layer.

The underlying electrode layer includes at least one layer among layers such as a baked electrode layer, a resin electrode layer, and a thin film electrode layer as described below.

The baked electrode layer is a layer containing glass and a metal and may be formed of one layer or a plurality of layers. The baked electrode layer contains, for example, a metal such as Cu, Ni, Ag, Pd, or Au, or an alloy of Ag and Pd.

The baked electrode layer is formed by applying a conductive paste containing glass and a metal to the laminate and baking the laminate. The baking may be performed simultaneously with firing of the laminate or after firing of the laminate.

It is possible to form the resin electrode layer as, for example, a layer containing conductive grains and a thermosetting resin. When the resin electrode layer is formed, the resin electrode layer may be formed directly on the laminate without forming the baked electrode layer. The resin electrode layer may be formed of one layer or a plurality of layers.

The thin film electrode layer is, for example, a 1-μm-or-less layer obtained by depositing metal grains, and it is possible to form the thin film electrode layer by a known thin film forming method such as sputtering or vapor deposition.

The plating layer disposed on the underlying electrode layer contains at least one of, for example, a metal such as Cu, Ni, Ag, Pd, or Au, or an alloy of Ag and Pd. The plating layer may be formed of one layer or a plurality of layers. The plating layer, however, preferably has a two-layer structure including a Ni plating layer and a Sn plating layer. The Ni plating layer has a function of preventing the underlying electrode layer from being eroded by solder for mounting the multilayer ceramic capacitor 10. The Sn plating layer has a function of improving the wettability of solder for mounting the multilayer ceramic capacitor 10.

The first external electrode 14a and the second external electrode 14b may be formed of the plating layer disposed directly on the laminate 11 without including the above-mentioned underlying electrode layer. In this case, the plating layer is directly connected to the first internal electrode 13a or the second internal electrode 13b. Hereinafter, described in detail is the plating layer of cases where the first external electrode 14a and the second external electrode 14b are configured to include the plating layer formed directly on the laminate 11 without including the above-mentioned underlying electrode layer.

The plating layer preferably includes a first plating layer formed on the laminate 11 and a second plating layer formed on the first plating layer. When the plating layer is formed by nonelectrolytic plating, however, a catalyst may be provided on the laminate 11.

The first plating layer and the second plating layer preferably contain, for example, one metal selected from the group consisting of Cu, Ni, Sn, Pb, Au, Ag, Pd, Bi, and Zn, or an alloy containing the metals.

For example, when Ni is used as the internal electrode, it is preferable to use, as the first plating layer, Cu having good jointing properties with Ni. As the second plating layer, it is preferable to use Sn or Au having good solder wettability. As the first plating layer, Ni may be used that has solder barrier performance.

The second plating layer may be formed as necessary. Accordingly, the first external electrode 14a and the second external electrode 14b may be configured to include only the first plating layer. The first external electrode 14a and the second external electrode 14b may be configured to further include, in addition to the first plating layer and the second plating layer, another plating layer formed on the second plating layer.

The plating layer preferably has a metal ratio per unit volume of 99 vol % or more. The plating layer preferably contains no glass. The plating layer is formed through grain growth along the thickness direction and is columnar.

As described above, a multilayer ceramic capacitor 10 according to the first embodiment includes a laminate 11 obtained by alternately stacking a plurality of dielectric layers 12 and a plurality of internal electrodes 13 (13a and 13b), and external electrodes 14 (14a and 14b) that are provided on a surface of the laminate 11 and are electrically conductive to the internal electrodes 13 extended to the surface of the laminate 11. Each of the dielectric layers 12 contains first crystal grains that are disposed in a plane direction on a surface perpendicular to a stacking direction of the internal electrodes 13 and contain Ba, Ti, and a first rare-earth element, and second crystal grains that are disposed in the plane direction and contain Ba, Ti, and a second rare-earth element. With a first mole ratio of the first rare-earth element to the Ti contained in a range from an interface to 50 nm inclusive of the first crystal grains defined as M1 and a second mole ratio of the first rare-earth element to the Ti contained in a range of 50 nm to 100 nm inclusive from the interface of the first crystal grains defined as M2, the mole ratios M1 and M2 satisfy a relationship $0.95 \leq (M1/M2) \leq 1.05$. A third mole ratio M3 of the second rare-earth element to the Ti contained in the second crystal grains is half or less of a fourth mole ratio M4 of the first rare-earth element to the Ti contained in the first crystal grains. The rare-earth elements are also contained among the first crystal grains and among the second crystal grains outside of the solid solution, and a concentration of the second rare-earth element contained outside of the solid solution of the second crystal grains is lower than a concentration of the first rare-earth element contained outside of the solid solution of the first crystal grains.

The multilayer ceramic capacitor 10 according to the first embodiment that has such a configuration is capable of suppressing the degradation of the insulation resistance in the high-temperature environment.

Here, the oxygen vacancies contained in the crystal grains of the dielectric layer are considered to be a charge channel, and a large amount of the oxygen vacancies facilitates migration of charge to easily cause the degradation of the insulation resistance. Particularly, the oxygen vacancies easily migrate to the vicinity of a negative electrode in the high-temperature environment, and thus the amount of the oxygen vacancies is, under load, locally increased on a side of the negative electrode of the dielectric layer to easily cause the degradation of the insulation resistance.

In the multilayer ceramic capacitor 10 according to the present embodiment, however, the rare-earth element is disposed in the crystal grains forming the dielectric layer and at the interfaces of the crystal grains so that the multilayer ceramic capacitor 10 is capable of suppressing the migration of the oxygen vacancies and thus suppressing the degradation of the insulation resistance.

Example

A first dielectric raw material formulation to be first crystal grains were prepared by a following method.

First, $BaTiO_3$ was weighed and then wet-blended by a ball mill to crush an aggregate.

Next, the low-crystallinity $BaTiO_3$ was blended with component materials to be added, with the components to be added and the addition amounts of the components represented by a following composition formula, and mixed by a ball mill, with water used as a medium. Thereafter, the resultant mixture was subjected to evaporative drying to give a first dielectric raw material formulation.

Composition formula:

In the composition formula, m=1.0070, a=5.0, b=0.08, c=0.56, d=1.0, and e=0.1.

As the component materials to be added, $BaCO_3$, $Dy_2O_3$, $MgCO_3$, $MnCO_3$, $SiO_2$, and $V_2O_5$ were used.

A second dielectric raw material formulation to be second crystal grains were also prepared by a following method.

First, $BaTiO_3$ having higher crystallinity than $BaTiO_3$ used for preparing the first crystal grains was weighed and wet-mixed by a ball mill to crush an aggregate.

Next, the $BaTiO_3$ was blended with component materials to be added, with the components to be added and the addition amounts of the components represented by a following composition formula, and mixed by a ball mill, with water used as a medium. Thereafter, the resultant mixture was subjected to evaporative drying to give a second dielectric raw material formulation.

Composition formula:

In the composition formula, m=1.0070, a=5.0, b=0.08, c=0.56, d=1.0, and e=0.1.

As the component materials to be added, $BaCO_3$, $Dy_2O_3$, $MgCO_3$, $MnCO_3$, $SiO_2$, and $V_2O_5$ were used.

A polyvinyl butyral binder and an organic solvent such as ethanol were added to the first dielectric raw material formulation and the second dielectric raw material formulation and wet-mixed by a ball mill for a prescribed time to prepare a ceramic slurry. Then, the prepared ceramic slurry was formed into a sheet so that the fired dielectric layer had a thickness of 3 µm, to give a ceramic green sheet.

In the meantime, the first dielectric raw material formulation and the second dielectric raw material formulation may be formed into separate sheets without mixing the formulations with each other, and the two sheets may be overlapped to prepare one ceramic green sheet.

Even the same material formulation generates, depending on the crystallinity of $BaTiO_3$ as a base material, a difference to give a solid-solution structure containing the rare-earth element uniformly or to give a core-shell structure, allowing the crystal grains containing a complete solid solution of the rare-earth element to easily gather in a central portion along the thickness direction of the ceramic green sheet.

Subsequently, an internal electrode conductive paste was prepared and applied onto the ceramic green sheet so that the fired electrode had a thickness of 1.0 µm by printing the internal electrode conductive paste, to form an internal electrode pattern. The internal electrode conductive paste contains, for example, a Ni powder, an organic solvent, and a binder. For the application of the internal electrode conductive paste, it is possible to use a printing method such as screen printing or gravure printing.

Subsequently, ceramic green sheets having no internal electrode pattern formed thereon were stacked in a prescribed number of layers, a ceramic green sheet having the internal electrode pattern formed thereon was sequentially stacked on the stacked layers, and ceramic green sheets having no internal electrode pattern formed thereon were further stacked in a prescribed number of layers on the stacked layers to prepare a mother laminate.

Subsequently, the mother laminate was pressed and then cut into a prescribed size. It is possible to perform the pressing by, for example, a rigid press or an isostatic press. It is possible to perform the cutting of the mother laminate after the pressing by a cutting method such as pressing and cutting, cutting with a dicing machine, or cutting with laser.

Thereafter, corners and ridge line portions of the cut laminate may be rounded by, for example, barrel polishing. The above-mentioned steps give a non-fired laminate. The internal electrode pattern is exposed on both end surfaces of the non-fired laminate.

Subsequently, the non-fired laminate was fired to prepare a laminate. The firing temperature is preferably set at 900° C. or higher and 1300° C. or lower, for example.

As described above, the ceramic green sheet was prepared by mixing the first dielectric raw material formulation with the second dielectric raw material formulation to give a mixture. The process of obtaining the laminate by firing the non-fired laminate separates the mixture into a layer containing the first grains more and a layer containing the second grains more and thus forms a first grain layer and a second grain layer.

Subsequently, an external electrode conductive paste was applied to both end surfaces of the laminate and baked to form a baked electrode layer. The baking temperature is, for example, 700° C. or higher and 900° C. or lower.

Thereafter, plating may be performed on the baked electrode layer to form a plating layer, as necessary.

Here, the external electrode was formed as the baked electrode layer, but it is possible to form the plating layer directly on the laminate as described above. In this case, plating is performed on both end surfaces of the laminate to form an underlying plating film. As the plating, either one of electrolytic plating and nonelectrolytic plating may be employed. The nonelectrolytic plating, however, requires a pretreatment such as addition of a catalyst to improve the rate of plating deposition, and thus complicates the steps. Accordingly, electrolytic plating is preferably employed. As a plating method, barrel plating is preferably employed.

When a surface conductor is formed, a surface conductor pattern may be preliminarily printed on an outermost-layer ceramic green sheet and simultaneously fired with the non-fired laminate or a surface conductor may be printed on a main surface of the fired laminate and then baked.

Thereafter, plating is performed on a surface of the formed underlying plating film to form a plating layer as necessary.

A multilayer ceramic capacitor was produced by the above-mentioned method.

Second Embodiment

In the multilayer ceramic capacitor 10 according to the first embodiment, the inner dielectric layer 122 of the dielectric layer 12 is formed of the two layers, i.e., the first grain layer 41 and the second grain layer 42.

Figure 5:
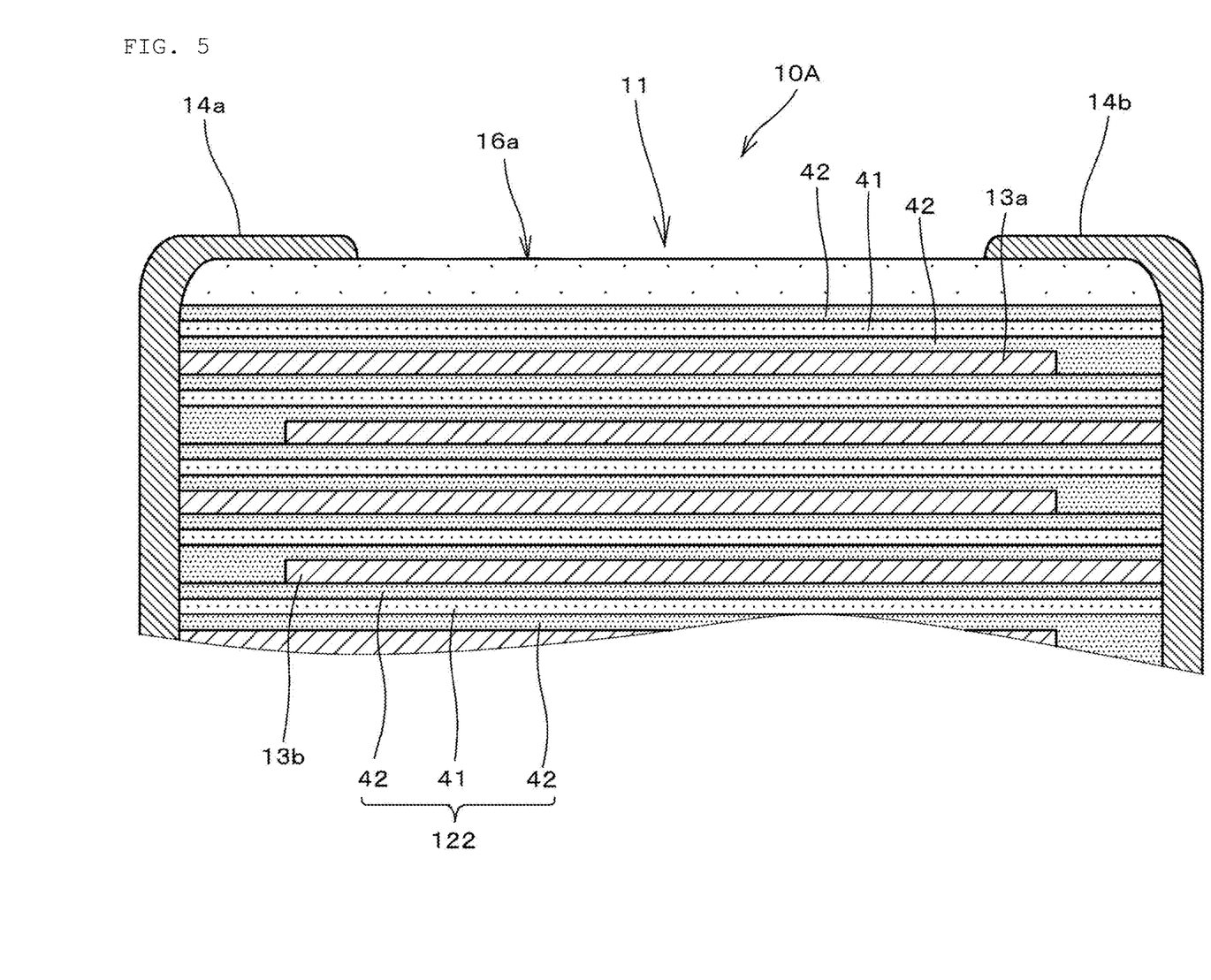
FIG. 5 is a partially enlarged view of a section of a multilayer ceramic capacitor according to a second embodiment and is a schematic sectional view for illustrating a detailed configuration of a dielectric layer.

On the other hand, in a multilayer ceramic capacitor according to a second embodiment, the inner dielectric layer 122 of the dielectric layer 12 is formed of three layers, i.e., the second grain layer 42, the first grain layer 41, and the second grain layer 42.

FIG. 5 is a partially enlarged view of a section of a multilayer ceramic capacitor 10A according to the second embodiment and is a schematic sectional view for illustrating a detailed configuration of the dielectric layer 12. As shown in FIG. 5, the inner dielectric layer of the dielectric layer 12 is formed of the three layers, i.e., the second grain layer 42, the first grain layer 41, and the second grain layer 42. Specifically, the three layers are configured so that the first grain layer 41 is sandwiched between the two second grain layers 42 in the thickness direction T.

The multilayer ceramic capacitor 10A according to the second embodiment is also capable of suppressing the degradation of the insulation resistance in the high-temperature environment similarly to the multilayer ceramic capacitor 10 according to the first embodiment. Further, the multilayer ceramic capacitor 10A according to the second embodiment is capable of more effectively suppressing the change in the dielectric constant attributed to temperature change than the multilayer ceramic capacitor 10 according to the first embodiment.

Here, a following method is capable of detecting whether or not the three layers, i.e., the second grain layer 42, the first grain layer 41, and the second grain layer 42 are interposed between the first internal electrode 13a and the second internal electrode 13b.

First, the laminate 11 is polished to expose a section that allows the first internal electrode 13a and the second internal electrode 13b to be observed in an identical visual field, and the section is analyzed by wavelength dispersive X-ray analysis to detect the rare-earth element. As regards this detection in the inner dielectric layer positioned between the first internal electrode 13a and the second internal electrode 13b, when the amount of the rare-earth element contained in a central portion in the thickness direction T is detected to be larger than the amounts of the rare-earth element contained in parts positioned on both outer sides in the thickness direction T of the central portion, it is possible to determine that the inner dielectric layer is configured such that the first grain layer 41 is sandwiched between the two second grain layers 42.

It is possible to set the sensitivity for detecting the rare-earth element at any degree, but setting is made to clarify a difference in content of the rare-earth element contained in each of the central portion in the thickness direction T and the parts positioned on both outer sides of the central portion.

[Evaluation]

(Average Failure Time)

Multilayer ceramic capacitors produced by the above-mentioned methods were evaluated for their high-temperature acceleration life by measuring their life time while keeping them at a high temperature of 195° C., under 110-V DC voltage application. Here, with a failure time defined as a time from the start of the voltage application till one order of magnitude reduction in the insulation resistance, the failure time was subjected to Weibull analysis to calculate an average failure time, which was defined as a life.

Figure 6:
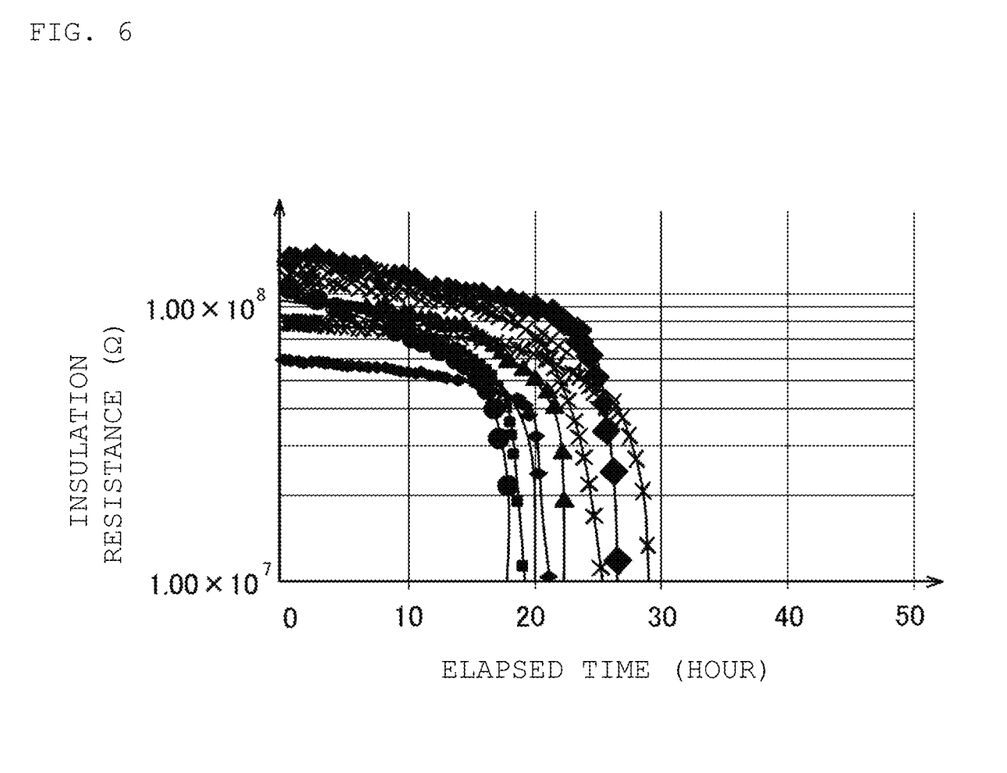
FIG. 6 is a graph illustrating a relationship between the time elapsed from the start of voltage application and the insulation resistance of multilayer ceramic capacitors according to the first embodiment.
Figure 7:
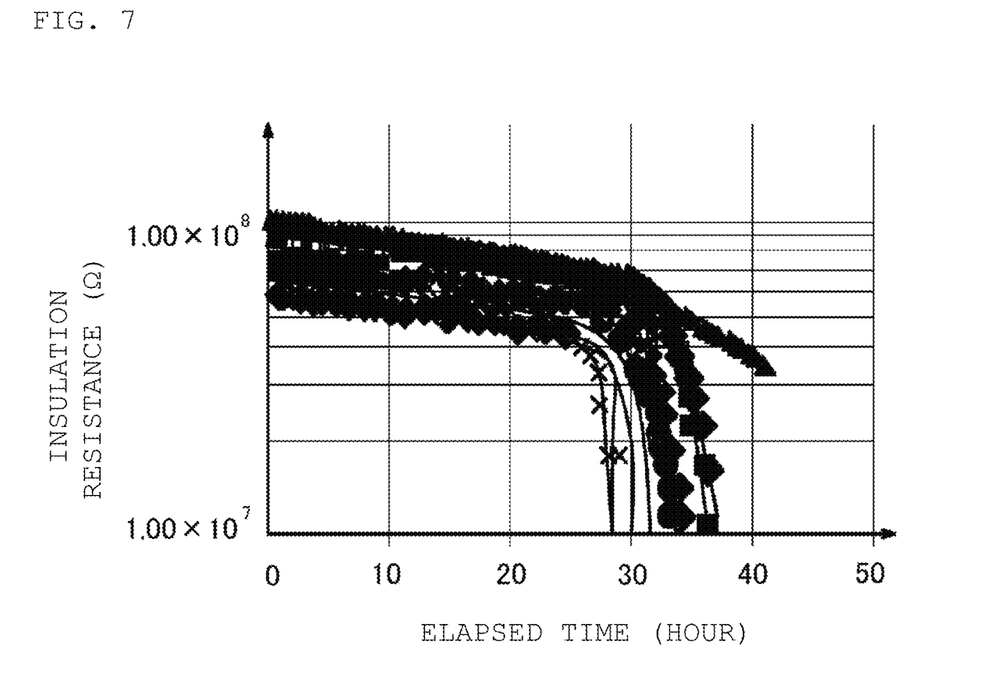
FIG. 7 is a graph illustrating a relationship between the time elapsed from the start of voltage application and the insulation resistance of multilayer ceramic capacitors according to the second embodiment.
Figure 8:
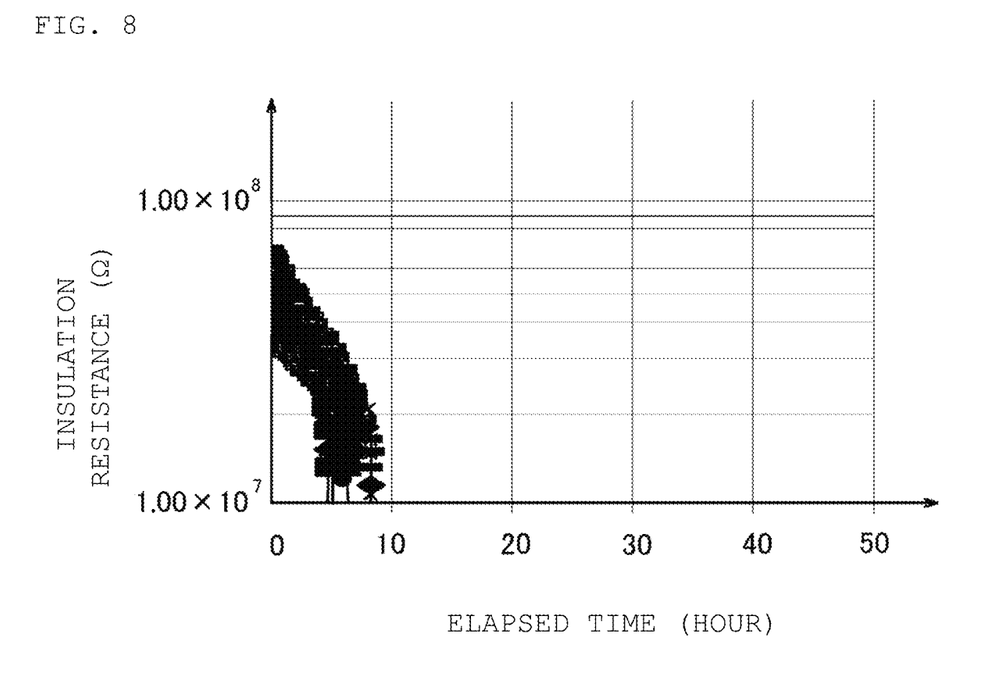
FIG. 8 is a graph illustrating a relationship between the time elapsed from the start of voltage application and the insulation resistance of multilayer ceramic capacitors according to a comparative example.

FIGS. 6 to 8 are each a graph illustrating a relationship between the time elapsed from the start of voltage application and the insulation resistance of nine multilayer ceramic capacitors. FIGS. 6, 7, and 8 each illustrate the relationship between the time elapsed from the start of voltage application and the insulation resistance, with FIG. 6 being for the multilayer ceramic capacitors according to the first embodiment, FIG. 7 for the multilayer ceramic capacitors according to the second embodiment, and FIG. 8 for the multilayer ceramic capacitors according to a comparative example.

The multilayer ceramic capacitors according to the comparative example are capacitors including a dielectric layer that contains the rare-earth element as much as the multilayer ceramic capacitor according to the example but contains only the crystal grains having a core-shell structure.

The nine multilayer ceramic capacitors according to the first embodiment gave an average failure time of 21.1 hours. The nine multilayer ceramic capacitors according to the second embodiment gave an average failure time of 32.8 hours. On the other hand, the nine multilayer ceramic capacitors according to the comparative example gave an average failure time of 6.7 hours. That is, the multilayer ceramic capacitors according to the first and second embodiments have a longer average failure time than the multilayer ceramic capacitors according to the comparative example and are capable of suppressing the degradation of the insulation resistance in the high-temperature environment.

(Temperature Characteristics of Electrostatic Capacitance)

A multilayer ceramic capacitor to be evaluated was heated under the conditions of 150° C. and 1 hour and then left to stand at room temperature for 24 hours.

Next, the multilayer ceramic capacitor was set in a thermostatic bath and measured for its electrostatic capacitance under the conditions of 1 kHz and 1V while the temperature was changed in a range of −55° C. to 135° C. Then, a rate of change in the electrostatic capacitance at each temperature was calculated, with the electrostatic capacitance at 25° C. set as a standard.

Figure 9:
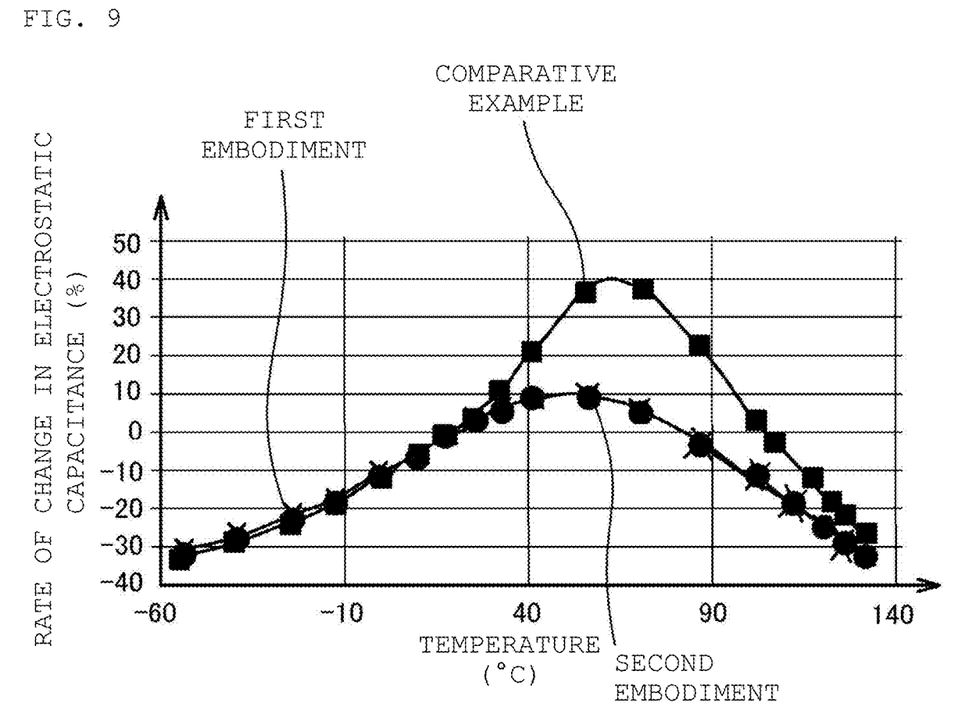
FIG. 9 is a graph illustrating the rate of change in the electrostatic capacitance to the temperature change of the multilayer ceramic capacitors according to the first embodiment, the second embodiment, and the comparative example.

FIG. 9 is a graph illustrating the rate of change in the electrostatic capacitance to the temperature change of the multilayer ceramic capacitors according to the first embodiment, the second embodiment, and the comparative example. The multilayer ceramic capacitor according to the comparative example is a capacitor including a dielectric layer formed using no second dielectric raw material formulation but using the first dielectric raw material formulation in the production steps.

The multilayer ceramic capacitors according to the first and second embodiments gave a standard value of ±33% or less as the rate of change in the electrostatic capacitance to the temperature change.

On the other hand, the multilayer ceramic capacitor according to the comparative example gave a larger rate of change in the electrostatic capacitance than the multilayer ceramic capacitors according to the first and second embodiments at a temperature of higher than 40° C. Particularly, the multilayer ceramic capacitor according to the comparative example gave a value close to 40% as a maximum value of the rate of change in the electrostatic capacitance, exceeding the standard value±33%.

As described above, the multilayer ceramic capacitors according to the first and second embodiments are capable of suppressing the change in the electrostatic capacitance to the temperature change.

The present invention is not limited to the above-mentioned embodiments, and it is possible to add various applications and modifications to the multilayer ceramic capacitors according to the embodiments within the scope of the present invention.

In the above-mentioned embodiments, the cases of using dysprosium as the rare-earth element have been exemplified to describe the present invention. Cases of using a rare-earth element other than Dy are also capable of giving the same effect. That is, the rare-earth element is not limited to Dy, but other rare-earth elements including La, Sm, Gd, Y, Ho, and Yb may also be used.

The multilayer ceramic capacitor 10 according to the first embodiment includes the inner dielectric layer 122 formed of the two layers, i.e., the first grain layer 41 and the second grain layer 42, and the multilayer ceramic capacitor 10A according to the second embodiment includes the inner dielectric layer 122 formed of the three layers, i.e., the second grain layer 42, the first grain layer 41, and the second grain layer 42. The inner dielectric layer 122, however, may be configured to have a stacking structure of four or more layers including the first grain layers 41 and the second grain layers 42 alternately stacked on top of one another.

What is claimed is:

1. A multilayer ceramic capacitor comprising:
a laminate having a plurality of dielectric layers and a plurality of internal electrodes that are alternately stacked;
a first external electrode on a first surface of the laminate and electrically connected to a first set of the plurality of internal electrodes extended to the first surface of the laminate; and
a second external electrode on a second surface of the laminate and electrically connected to a second set of the plurality of internal electrodes extended to the second surface of the laminate,
each of the dielectric layers containing:
first crystal grains disposed in a plane direction perpendicular to a stacking direction of the internal electrodes and that contain a solid solution of Ba, Ti, and a first rare-earth element; and
second crystal grains disposed in the plane direction and that contain a solid solution of Ba, Ti, and a second rare-earth element,
where a first mole ratio M1 is the first rare-earth element to the Ti contained in a range of 50 nm or less from an interface of the first crystal grains and a second mole ratio M2 is the first rare-earth element to the Ti contained in a range of 50 nm to 100 nm from the interface of the first crystal grains,
M1 and M2 satisfy $0.95 \leq M1/M2 \leq 1.05$,
a third mole ratio M3 of the second rare-earth element to the Ti in the second crystal grains is half or less of a fourth mole ratio M4 of the first rare-earth element to the Ti in the first crystal grains, and
a first concentration of the second rare-earth element contained outside of a solid solution of the second crystal grains is lower than a second concentration of the first rare-earth element contained outside of a solid solution of the first crystal grains, and
wherein the dielectric layer includes a first grain layer containing the first crystal grains continuously disposed in the plane direction and a second grain layer containing the second crystal grains continuously disposed in the plane direction.

2. The multilayer ceramic capacitor according to claim 1, further comprising a third grain layer containing the second crystal grains,
the second and the third grain layers are disposed between two adjacent internal electrodes of the plurality of internal electrodes in the stacking direction, and
the first grain layer is sandwiched between the second and the third grain layers.

3. The multilayer ceramic capacitor according to claim 1, wherein the second mole ratio M2 is 1.7 times or more of a fifth mole ratio M5 of the second rare-earth element to the Ti contained in a range of 50 nm to 100 nm from an interface of the second crystal grains.

4. The multilayer ceramic capacitor according to claim 2, wherein the second mole ratio M2 is 1.7 times or more of a fifth mole ratio M5 of the second rare-earth element to the Ti contained in a range of 50 nm to 100 nm from an interface of the second crystal grains.

5. The multilayer ceramic capacitor according to claim 1, wherein each of the plurality of dielectric layers has a thickness of 0.1 μm to 6.0 μm.

6. The multilayer ceramic capacitor according to claim 1, wherein a first average grain size of the first crystal grains is larger than a second average grain size of the second crystal grains.

7. The multilayer ceramic capacitor according to claim 6, wherein
the first average grain size is 150 nm to 500 nm, and
the second average grain size is 100 nm to 200 nm.

8. The multilayer ceramic capacitor according to claim 2, wherein a first average grain size of the first crystal grains is larger than a second average grain size of the second crystal grains.

9. The multilayer ceramic capacitor according to claim 8, wherein
the first average grain size is 150 nm to 500 nm, and
the second average grain size is 100 nm to 200 nm.

10. The multilayer ceramic capacitor according to claim 1, wherein the second crystal grains have a core-shell structure in which a sixth mole ratio M6 of the second rare-earth element to the Ti contained in a range of 50 nm or less from the interface of the second crystal grains is higher than a fifth mole ratio M5 of the second rare-earth element to the Ti contained in the range of 50 nm to 100 nm from the interface of the second crystal grains.

11. The multilayer ceramic capacitor according to claim 2, wherein the second crystal grains have a core-shell structure in which a sixth mole ratio M6 of the second rare-earth element to the Ti contained in a range of 50 nm or less from the interface of the second crystal grains is higher than a fifth mole ratio M5 of the second rare-earth element to the Ti contained in the range of 50 nm to 100 nm from the interface of the second crystal grains.

12. The multilayer ceramic capacitor according to claim 1, wherein a content of the first rare-earth element contained in the first crystal grains is 6 parts by mole or more relative to 100 parts by mole of Ti.

13. The multilayer ceramic capacitor according to claim 1, wherein the plurality of internal electrodes contain dielectric grains of an identical composition system as that contained in the plurality of dielectric layers.

14. The multilayer ceramic capacitor according to claim 1, wherein the first and second rare-earth elements are selected from Dy, La, Sm, Gd, Y, Ho, and Yb.

15. A multilayer ceramic capacitor comprising:
a laminate having a plurality of dielectric layers and a plurality of internal electrodes that are alternately stacked;
a first external electrode on a first surface of the laminate and electrically connected to a first set of the plurality of internal electrodes extended to the first surface of the laminate; and
a second external electrode on a second surface of the laminate and electrically connected to a second set of the plurality of internal electrodes extended to the second surface of the laminate,
each of the dielectric layers containing:
first crystal grains disposed in a plane direction perpendicular to a stacking direction of the internal electrodes and that contain a solid solution of Ba, Ti, and a first rare-earth element; and
second crystal grains disposed in the plane direction and that contain a solid solution of Ba, Ti, and a second rare-earth element,
where a first mole ratio M1 is the first rare-earth element to the Ti contained in a range of 50 nm or less from an interface of the first crystal grains and a second mole ratio M2 is the first rare-earth element to the Ti contained in a range of 50 nm to 100 nm from the interface of the first crystal grains,
M1 and M2 satisfy $0.95 \leq M1/M2 \leq 1.05$,
a third mole ratio M3 of the second rare-earth element to the Ti in the second crystal grains is half or less of a fourth mole ratio M4 of the first rare-earth element to the Ti in the first crystal grains, and
a first concentration of the second rare-earth element contained outside of a solid solution of the second crystal grains is lower than a second concentration of the first rare-earth element contained outside of a solid solution of the first crystal grains,
wherein the second mole ratio M2 is 1.7 times or more of a fifth mole ratio M5 of the second rare-earth element to the Ti contained in a range of 50 nm to 100 nm from an interface of the second crystal grains.

16. The multilayer ceramic capacitor according to claim 15, wherein a first average grain size of the first crystal grains is larger than a second average grain size of the second crystal grains.

17. The multilayer ceramic capacitor according to claim 16, wherein
the first average grain size is 150 nm to 500 nm, and
the second average grain size is 100 nm to 200 nm.

18. The multilayer ceramic capacitor according to claim 15, wherein the second crystal grains have a core-shell structure in which a sixth mole ratio M6 of the second rare-earth element to the Ti contained in a range of 50 nm or less from the interface of the second crystal grains is higher than a fifth mole ratio M5 of the second rare-earth element to the Ti contained in the range of 50 nm to 100 nm from the interface of the second crystal grains.

19. A multilayer ceramic capacitor comprising:
a laminate having a plurality of dielectric layers and a plurality of internal electrodes that are alternately stacked;
a first external electrode on a first surface of the laminate and electrically connected to a first set of the plurality of internal electrodes extended to the first surface of the laminate; and
a second external electrode on a second surface of the laminate and electrically connected to a second set of the plurality of internal electrodes extended to the second surface of the laminate,
each of the dielectric layers containing:
first crystal grains disposed in a plane direction perpendicular to a stacking direction of the internal electrodes and that contain a solid solution of Ba, Ti, and a first rare-earth element; and
second crystal grains disposed in the plane direction and that contain a solid solution of Ba, Ti, and a second rare-earth element,
where a first mole ratio M1 is the first rare-earth element to the Ti contained in a range of 50 nm or less from an interface of the first crystal grains and a second mole ratio M2 is the first rare-earth element to the Ti contained in a range of 50 nm to 100 nm from the interface of the first crystal grains,
M1 and M2 satisfy $0.95 \leq M1/M2 \leq 1.05$,
a third mole ratio M3 of the second rare-earth element to the Ti in the second crystal grains is half or less of a fourth mole ratio M4 of the first rare-earth element to the Ti in the first crystal grains, and
a first concentration of the second rare-earth element contained outside of a solid solution of the second crystal grains is lower than a second concentration of the first rare-earth element contained outside of a solid solution of the first crystal grains,
wherein the first and second rare-earth element is Dy.

* * * * *